(12) United States Patent
Spanias et al.

(10) Patent No.: US 11,765,609 B2
(45) Date of Patent: Sep. 19, 2023

(54) SYSTEMS AND METHODS FOR CONSENSUS-BASED DISTRIBUTED GRAPH SPECTRAL RADIUS ESTIMATION

(71) Applicants: Andreas Spanias, Tempe, AZ (US); Cihan Tepedelenlioglu, Tempe, AZ (US); Gowtham Muniraju, Tempe, AZ (US)

(72) Inventors: Andreas Spanias, Tempe, AZ (US); Cihan Tepedelenlioglu, Tempe, AZ (US); Gowtham Muniraju, Tempe, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 208 days.

(21) Appl. No.: 17/345,652

(22) Filed: Jun. 11, 2021

(65) Prior Publication Data
US 2021/0392529 A1  Dec. 16, 2021

Related U.S. Application Data

(60) Provisional application No. 63/038,430, filed on Jun. 12, 2020.

(51) Int. Cl.
*H04W 24/08* (2009.01)
*H04W 84/18* (2009.01)

(52) U.S. Cl.
CPC ............ *H04W 24/08* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 10,028,085 B2 | 7/2018 | Zhang et al. | |
| 10,440,553 B2 | 10/2019 | Zhang et al. | |
| 2020/0359296 A1* | 11/2020 | Dugaev | H04B 17/318 |

OTHER PUBLICATIONS

Chakrabarti et al., Epidemic thresholds in real networks, ACM Transactions on Information and System Security (TISSEC), vol. 10, No. 4, pp. 1-26, 2008.
Cohen, Subadditivity, generalized products of random matrices and operations research, SIAM review, vol. 30, No. 1, pp. 69-86, 1988.
Di Lorenzo et al., Distributed estimation and control of algebraic connectivity over random graphs, IEEE Transactions on Signal Processing, vol. 62, No. 21, pp. 5615-5628, 2014.
(Continued)

*Primary Examiner* — Saad Khawar
(74) *Attorney, Agent, or Firm* — POLSINELLI PC

(57) ABSTRACT

A system estimates spectral radius and leverages local updates from neighboring nodes in a wireless network to iteratively update state values of each node in the network and estimate a spectral radius of the network with guaranteed convergence. A method associated with the system method is a distributed method that efficiently converges to an invertible function of the spectral radius based only on local communications of the network for digital communication models in the presence and/or absence of packet loss, as opposed to conventional centralized methods.

20 Claims, 9 Drawing Sheets
(6 of 9 Drawing Sheet(s) Filed in Color)

(56) References Cited

OTHER PUBLICATIONS

Elphick et al., New measures of graph irregularity, Electronic Journal of Graph Theory and Applications (EJGTA), vol. 2, No. 1, pp. 52-65, 2014.

Fiedler et al., Spectral radius and hamiltonicity of graphs, Linear Algebra and its Applications, Elsevier, vol. 432, No. 9, pp. 2170-2173, 2010.

Ghosh et al., Growing well-connected graphs, Proceed-ings of the 45th IEEE Conference on Decision and Control. IEEE, pp. 6605-6611, 2006.

Hagen et al., New spectral methods for ratio cut partitioning and clustering, IEEE transactions on computer-aided design of integrated circuits and systems, vol. 11, No. 9, pp. 1074-1085, 1992.

Ihler et al., Nonparametric belief propagation for self-localization of sensor networks, IEEE Jour-nal on Selected Areas in Communications, vol. 23, No. 4, pp. 809-819, 2005.

Iutzeler et al., Analysis of max-consensus algorithms in wireless channels, IEEE Transactions on Signal Processing, vol. 60, No. 11, pp. 6103-6107, 2012.

Jelasity et al., Asynchronous dis-tributed power iteration with gossip-based normalization, Euro-Par 2007 Parallel Processing. Springer, Berlin Heidelberg, pp. 514-525, 2007.

Le Borgne et al., Distributed principal component analysis for wireless sensor networks, Sensors, vol. 8, No. 8, pp. 4821-4850, 2008.

Li et al., Distributed estimation of algebraic connectivity of directed networks, Systems & Control Letters, vol. 62, No. 6, pp. 517-524, 2013.

Lu et al., Spectral radius and hamiltonian graphs, Linear algebra and its applications, North-Holland, vol. 437, No. 7, pp. 1670-1674, 2012.

Muniraju et al., Analysis and design of robust max consensus for wireless sensor networks, IEEE Transac-tions on Signal and Information Processing over Networks, vol. 5, No. 4, pp. 779-791, Dec. 2019.

Muniraju et al., Max consensus in the presence of additive noise, 2018 52nd Asilomar Conference on Signals, Systems, and Computers, pp. 1408-1412, Oct. 2018.

Muniraju, et al., Distributed Spectral Radius Estimation in Wireless Sensor Networks, Proceedings of 2019 53rd Asilomar Conference on Signals, Systems, and Computers, Nov. 2019.

Muniraju, et al., Location based distributed spectral clustering for wireless sensor networks, 2017 Sensor Signal Processing for Defence Conference (SSPD). IEEE, pp. 1-5, London, Dec. 2017.

Munirau et al., Analysis and design of robust max consensus for wireless sensor networks, IEEE Transactions on Signal and Information Processing over Networks, vol. 5, No. 4, pp. 779-791, Dec. 2019.

Nikiforov, Chromatic number and spectral radius, Linear algebra and its applications, vol. 426, No. 2-3, pp. 810-814, 2007.

Nowzari et al., Improved bounds for max consensus in wireless networks, IEEE Transactions on Signal and Information Processing over Networks, vol. 5, No. 2, pp. 305-319, Jun. 2019.

Olfati-Saber et al., Belief consensus and distributed hypothesis testing in sensor networks, Networked Embedded Sensing and Control. Springer, pp. 169-182, 2006.

Simonetto et al., On distributed maximiza-tion of algebraic connectivity in robotic networks, Proceedings of the 2011 American Control Conference. IEEE, pp. 2180-2185, 2011.

Stevanovics, Walk counts and the spectral radius of graphs, Bulletin (AcadeYmie serbe des sciences et des arts. Classe des sciences matheYmatiques et naturelles. Sciences matheYmatiques), No. 40, pp. 33-58, 2015.

Wilf, Spectral bounds for the clique and independence numbers of graphs, Journal of Combinatorial Theory, Series B, vol. 40, No. 1, pp. 113-117, 1986.

Wocjan et al., New spectral bounds on the chromatic number encompassing all eigenvalues of the adjacency matrix, The Electronic Journal of Combinatorics, vol. 20, No. 3, pp. 1-18, 2013.

Zavlanos et al., Graph-theoretic connectivity control of mobile robot networks, Proceedings of the IEEE, vol. 99, No. 9, pp. 1525-1540, 2011.

Zhang et al., Distributed network structure estimation using consensus methods, Synthesis Lectures on Communications, Morgan & Claypool, vol. 10, No. 1, pp. 1-88, 2018.

Zhang et al., Max consensus in sensor networks: Non-linear bounded transmission and additive noise, IEEE Sensors Journal, vol. 16, No. 24, pp. 9089-9098, 2016.

Thomason, Hamiltonian cycles and uniquely edge colourable graphs, Annals of Discrete Mathematics. Elsevier, vol. 3, pp. 259-7268, 1978.

\* cited by examiner

SYSTEMS AND METHODS FOR CONSENSUS-BASED DISTRIBUTED GRAPH SPECTRAL RADIUS ESTIMATION

CROSS-REFERENCE TO RELATED APPLICATIONS

This is a non-provisional application that claims benefit to U.S. Provisional Patent Application Ser. No. 63/038,430, filed on Jun. 12, 2020 which is herein incorporated by reference in its entirety.

GOVERNMENT SUPPORT

This invention was made with government support under 1646542 awarded by the National Science Foundation. The government has certain rights in the invention.

FIELD

The present disclosure generally relates to network connectivity analysis, and in particular to a system and associated method for determining a spectral radius for a network, using only local communications and considering packet loss, for digital transmission.

BACKGROUND

Distributed wireless sensor networks are an essential part of modern Internet of things (IoT) and sensor fusion systems. In such networks, all the distributed agents have to reach consensus on a value of interest. The spectral radius of the graph is the largest eigenvalue of the adjacency matrix and is a useful characterization of the network graph. The knowledge of spectral radius is needed to study graph coloring methods, properties of Hamiltonian paths in distributed networks, and to understand the convergence properties of belief propagation algorithms. Conventional systems for estimating the spectral radius of the graph include distributed power iteration. This can be done in a two-step process, by first computing the principal eigenvector and then estimating the spectral radius. This iterative method is computationally expensive, as the norm of the state value vector needs to be computed using consensus methods between iterations.

It is with these observations in mind, among others, that various aspects of the present disclosure were conceived and developed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Corresponding reference characters indicate corresponding elements among the view of the drawings. The headings used in the figures do not limit the scope of the claims.

DETAILED DESCRIPTION

Figure 1:
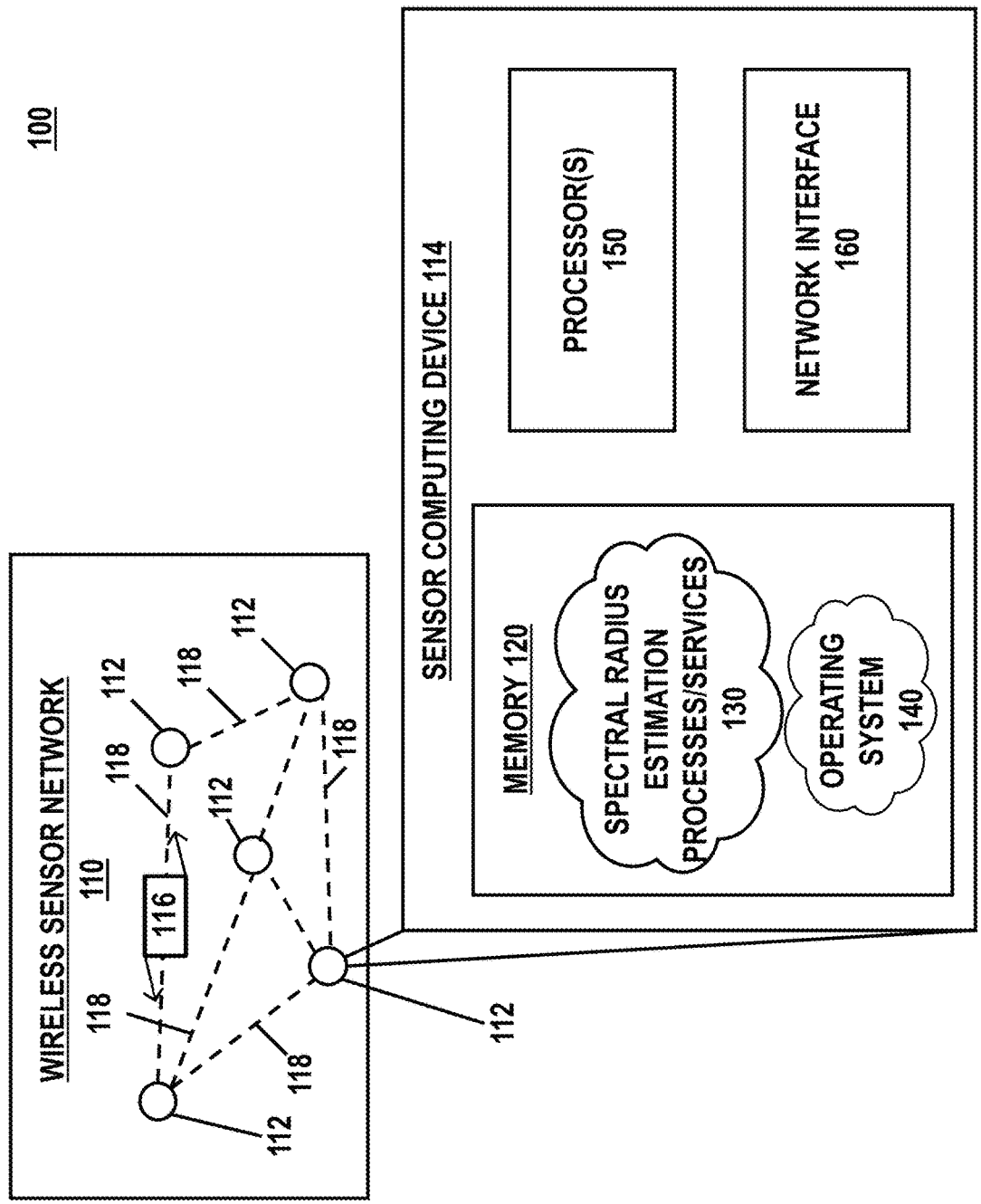
FIG. 1 is a schematic block diagram showing a wireless sensor network system configured for estimation of the spectral radius of the wireless sensor network.

A system and associated method for estimation of the spectral radius is disclosed herein. The system relies on local updates from neighboring nodes in a wireless network to iteratively update state values of each node in the network and estimate a spectral radius of the network with guaranteed convergence. The method is a distributed method that efficiently converges to an invertible function of the spectral radius based only on local communications of the network for digital communication models in the presence and/or absence of packet loss, as opposed to conventional centralized methods. Furthermore, insights on convergence are provided by proving that the convergence error is a function of principal eigenvector of the adjacency matrix. Additionally, this disclosure models packet loss and imperfect communications as time-varying graphs and analyzes convergence properties in that setting. Referring to the drawings, embodiments of a wireless sensor network system and associated method for determining the spectral radius of a wireless sensor network are illustrated and generally indicated as 100 and 200 in FIGS. 1-6.

System Model and Problem Statement

Referring to FIG. 1, the system 100 includes a wireless sensor network (WSN) 110 including a plurality of N nodes 112, where the communication among the nodes 112 is modeled as an undirected graph $\mathcal{G} = (V, \varepsilon)$. $V=\{1, \ldots, N\}$ is a set including the plurality of nodes 112 and $\varepsilon$ is a set of edges representative of communication links 118 that connect the nodes 112. As shown in FIG. 1, each node 112 is interconnected with one or more neighboring nodes 112 by communication links 118 and/or network segments and exchange or transport data such as data packets 116 to/from one another. Each individual edge in E is representative of a respective network link 118 between a node 112 and a neighboring node 112. A set of neighbors of node i 112 is denoted by $\mathbb{N}_i=\{j|\{i,j\}\in\varepsilon\}$. A degree of the $i^{th}$ node 112, denoted by $d_i=|\mathbb{N}_i|$, is a number of neighboring nodes 112 associated with the $i^{th}$ node 112. A degree matrix D is a diagonal matrix that contains the degrees of the nodes. A connectivity structure of the graph $\mathcal{G}$ representative of the WSN 110 is characterized by an adjacency matrix A defined by, $a_{ij}=1$ if $\{i,j\}\in\varepsilon$ and $a_{ij}=0$, otherwise. A spectral radius of the WSN 110 denoted herein by $\rho$ corresponds to a eigenvalue of the adjacency matrix A that has the largest magnitude.

Each node 112 in the WSN 110 maintains a real-valued state value over the course of a plurality of time iterations. At each time iteration of a plurality of time iterations, each node 112 broadcasts its state value to its neighboring nodes 112 across communication links 118 in a synchronized fashion. Further, such broadcasts can be affected by packet loss, i.e., a transmitted message or data packet 116 can be lost with a probability of p, independently for each communication links 118. Each individual node 112 includes a respective computing device 114 that maintains the state value of the node 112 and accepts state values from neighboring nodes 112. The computing device 114 can include processor(s) 150 in communication with a memory 120 including instructions associated with an operating system 140 for general node function and spectral radius estimation processes/services 130 for execution of the process 200. The computing device 114 can further include a network interface 160 for receipt and transmission of data packets 116 to and from neighboring nodes 112 over communication links 118. The goal of the present system 100 and associated process 200 is to determine a spectral radius of the WSN 110 by iteratively updating the state values of each node 112 of the WSN 110 that reach consensus on an invertible function of the spectral radius of the graph, using only neighbor-to-neighbor communications between each node 112.

Distributed Spectral Radius Estimation

Figure 2:
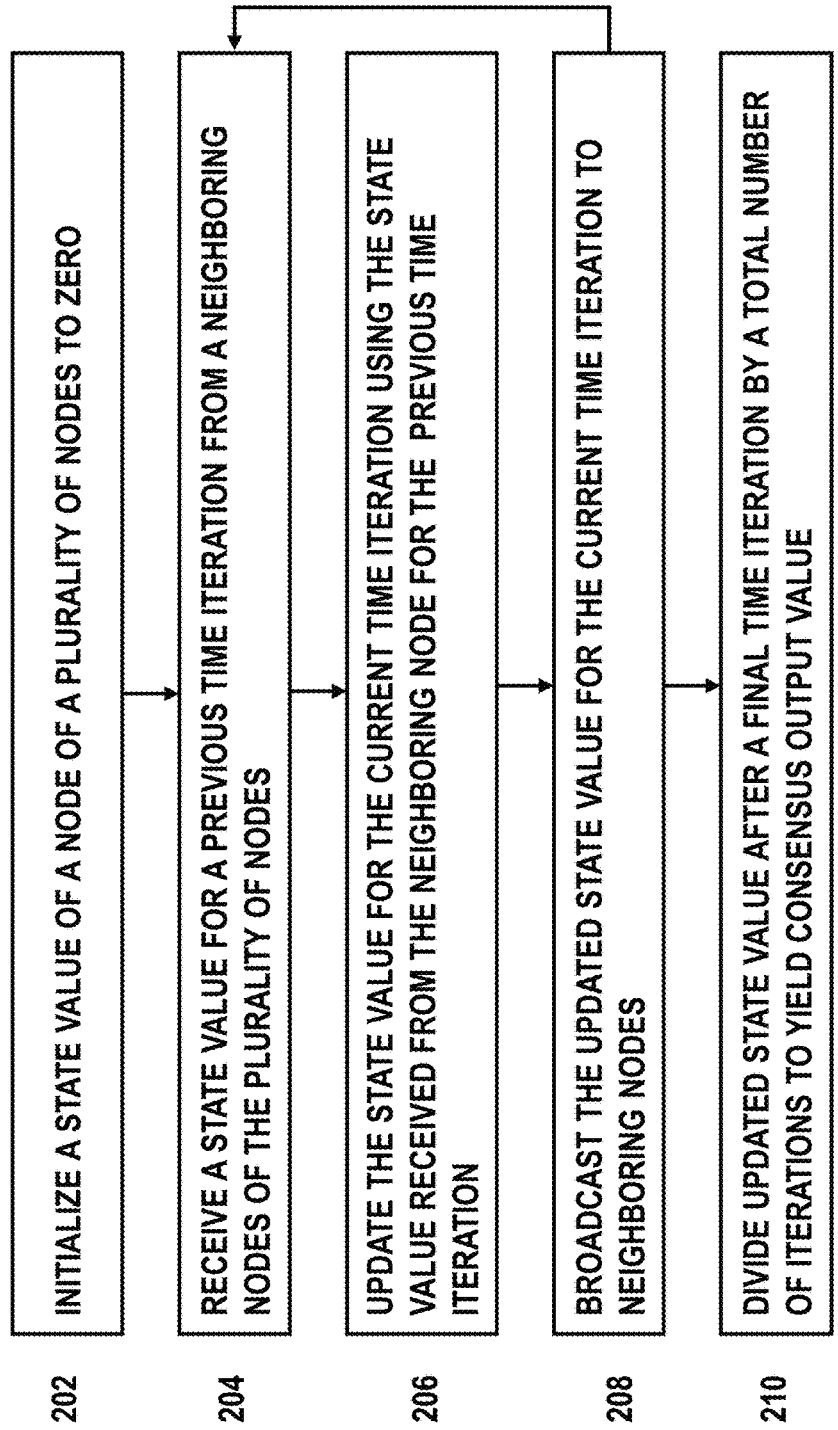
FIG. 2 is a flowchart showing a method for estimating a spectral radius of a time-variant or time-invariant network graph.

Referring to FIGS. 1 and 2, the distributed WSN 110 with N nodes 112 can be represented by the adjacency matrix A, with elements $a_{ij}$ and eigenvalues $\rho \triangleq \rho_i \geq \rho_2 \geq \ldots \rho_N$. Let the state values of the WSN 110 be denoted by $x(t)=[x_i(t), \ldots, x_N(t)]^T$ where $x_i(t)$ is the state value of node i 112 at iteration t. Spectral radius estimation processes/services module 130 executing process 200 takes N, A and $t_{max}$ as input. Referring to block 202, each node 112 initializes its respective state value to zero, i.e. x(0)=0. At block 204, at the first iteration, i.e. t=1, each node 112 receives a neighboring state value from each neighboring node 112 of the plurality of nodes 112. At each iteration and as shown in block 206, each node 112 updates its respective state value to be:

$$x_i(t) = \log(\Sigma_{j=1}^N a_{ij} \exp(x_j(t-1))), \text{ for } i=1, \ldots, N. \quad (1)$$

Note that at each iteration t each node 112 updates its state value to be the logarithm of the sum of exponentials of the received values in the previous iteration t−1, hence the dynamic range of the transmission is in the desired range. At block 208, this updated state value for the current time iteration is broadcasted to neighboring nodes 112 over communication links 118. Referring to block 210, after sufficiently many iterations, each node 112 locally computes an estimate of the log ($\rho$) as, $$y_i(t) = \frac{1}{t} x_i(t) \quad (2)$$

which divides the final state value at $t=t_{max}$ by the total number of iterations, i.e., $t_{max}$ iterations. $y_i(t_{max})$ is the final output representative of the logarithm of the spectral radius $\rho$ of the network.

The distributed process 200 to reach consensus on log($\rho$) is provided in Algorithm 1 and is illustrated in FIG. 2. The process 200 is started by resetting nodes to 0, followed by iterative equations (1) and (2) for $t_{max}$ iterations. For every node i, $y_i(t_{max})$ approximates log($\rho$).

---
Algorithm 1: Distributed estimation of spectral radius
---

1: Input: N, A, $t_{max}$
2: Initialization: $x(0) = [0, \cdots, 0]^T$
3: for t = 1, 2, $\cdots$, $t_{max}$
4: $x_i(t) = \log(\Sigma_{j=1}^N a_{ij} \exp(x_j(t-1)))$ 5: $\quad y_i(t) = \frac{1}{t} x_i(t)$ 6: end
7: Output: $y_i(t_{max})$

---

In order to analyze Algorithm 1, it is possible to express equations (1), (2) in matrix form as, $$x(t) = \log[A \exp[x(t-1)]], \quad (3)$$

$$y(t) = \frac{1}{t} x(t), \quad (4)$$

respectively, where log[·] and exp[·] are element-wise operations. The following theorem shows that for a large t, value of $y_i(t)$ converges to log($\rho$).

Proofing

Theorem 1. In a connected non-bipartite graph $\mathcal{G}$, with all nodes initialized to x(0)=0, for large t, $$y(t) = \log(\rho) 1 + \frac{1}{t} \log[q_1 \|q_1\|_1] + \mathcal{O}\left(\frac{1}{t}(\rho_2/\rho)^t\right)$$

where, $q_1$ is the principal eigenvector of A. In bipartite graphs $$y(t) = \log(\rho) 1 + \frac{1}{t}\left(\log\left[q_1 \sum_{j=1}^N q_{1j} + (-1)^t q_N \sum_{j=1}^N q_{Nj}\right]\right) + \mathcal{O}\left(\frac{1}{t}\left(\frac{max(|\rho_2|, |\rho_{N-1}|)}{\rho}\right)^t\right)$$

where, $q_N$ is the eigenvector corresponding to eigenvalue $-\rho$ of A.

Proof: Begin the proof by re-writing and simplifying equation 3 as, $$x(t) = \log[A \exp[x(t-1)]]$$
$$= \log[A \exp[\log[A \exp[x(t-2)]]]]$$
$$= \log[A \exp[\log[A \exp[\log[A \ldots A \exp[x(0)]]]]]]$$
$$= \log[A^t \exp[x(0)]]$$

Since, x(0)=0, then exp[x(0)]=1. Hence, $$x(t) = \log[A^t 1]. \quad (5)$$

Next, perform eigenvalue decomposition (EVD) of A as $A = Q \Delta Q^{-1}$, where $Q = [q_1, q_2, \ldots, q_N]$ is a matrix with eigenvectors $q_i = [q_{i1}, q_{i2}, \ldots, q_{iN}]^T$ as columns, and $\Delta$ is a diagonal matrix of real eigenvalues $\rho i$. Since A is real and symmetric, $Q^{-1} = Q^T$, thus $Q^T Q = I$ where I is the identity matrix. So, $$A^t = (Q \Delta Q^T)(Q \Delta Q^T) \ldots (Q \Delta Q^T) = Q \Delta^t Q^T. \quad (6)$$

From equations (6) and (5), equation (4) can be written as, $$y(t) = \frac{1}{c}\log[Q\Delta^t Q^T 1]. \quad (7)$$

Next, add and subtract $t \log(\rho)$ from RHS of equation (7):

$$y(t) = \frac{1}{t}(\log[Q\Delta^t \rho^{-t} Q^T 1] + t\log(\rho)1) = \log(\rho)1 + \frac{1}{t}(\log[QS^t Q^T 1]) \quad (8)$$

where, $S = \Delta \rho^{-1}$ is a diagonal matrix with entries $$\left(1, \frac{\rho_2}{\rho}, \ldots, \frac{\rho_N}{\rho}\right)$$

$QS^t Q^T 1$ can be expressed in summation form as, $$QS^t Q^T 1 = \sum_{i=1}^{N} q_i s_i^t \sum_{j=1}^{N} q_{ij} = q_1 \sum_{j=1}^{N} q_{1j} + \sum_{i=2}^{N} q_i s_i^t \sum_{j=1}^{N} q_{ij} \quad (9)$$

where, the second term in equation (9) is in $\mathcal{O}((\rho_2/\rho)^t)$. Hence, using equations (8) and (9), $y_i(t)$ can be written as $$y(t) = \log(\rho)1 + \frac{1}{t}\log[q_1\|q_1\|_1] + \mathcal{O}\left(\frac{1}{t}(\rho_2/\rho)^t\right) \quad (10)$$

This completes the proof for non-bipartite graphs.

Next, consider a graph $\mathcal{G}$ with the largest eigenvalue of $\rho$. Since $\mathcal{G}$ is bipartite, $-\rho$ is the smallest eigenvalue of its adjacency matrix. Therefore, for bipartite graphs, equation (8) reduces to $$y(t) = \log(\rho)1 + \frac{1}{t}\left(\log\left[q_1\sum_{j=1}^{N} q_{1j} + (-1)^t q_N \sum_{j=1}^{N} q_{Nj}\right]\right) + \sum_{i=2}^{N-1} q_i s_i^t \sum_{j=1}^{N} q_{ij} \quad (11)$$

where, the second term is in $\mathcal{O}(1/t)$ and the third term with.

$$\mathcal{O}\left(\frac{1}{t}\left(\frac{\max(|\rho_2|, |\rho_N - 1|)}{\rho}\right)^t\right).$$

Hence, as $t \to \infty$, $y(t)$ converges to $\log(\rho)$ with a damped oscillatory behavior.

Remark 1: For d-regular graphs, Algorithm 1 produces $y_i(t) = d = \rho$ for every t, and therefore has zero error. This agrees with equation (10) since for d-regular graphs, $q_1 = N^{-1/2} 1$, making the term $$\frac{1}{t}\log[q_1\|q_1\|_1] = 0.$$

Remark 2: It is clear from the proof that $\log(\cdot)$ and $\exp(\cdot)$ can be replaced by any pair of inverse functions and appropriate modifications in Algorithm 1. The advantage of the $\log(\cdot)$ and $\exp(\cdot)$ pair is that the elements of x(t) grow linearly with t, which ensures that $y(t) = t^{-1} x(t)$ converges as shown in Algorithm 1.

Time-Varying Graphs

In this section, application of the system 100 and associated process 200 for time-varying graphs is discussed. Real world WSNs 110 often experience transmission failures, i.e, transmitted message being dropped due to unreliable links. The unreliable links or packet loss are modeled as a time-varying graph that has independently removed edges with probability $\rho$. Note that Algorithm 1 in the presence of packet loss cannot guarantee convergence with a probability of one, because there is a non-zero probability that all node transmissions are dropped in some iteration. To remedy this, in the time-varying graphs, self-updates (corresponding to the self-loops in the graph) are considered to ensure that the state values of the nodes 112 of the WSN 110 are not dropped.

Consider the update equation (1), (line 4 in Algorithm 1) which can be modified to perform a self-update as, $$x_i(t+1) = \log\left(\exp(x_i(t)) + \sum_{j \in \mathbb{N}_i} \exp(x_j(t))\right). \quad (12)$$

The extra self-update term is needed in the packet loss case in equation (12), which comes with a performance degradation for the fixed graph case. Indeed, Theorem 1 can be re-proven by A replaced with A+I where I is the identity matrix, which adds one to every eigenvalue, showing that the convergence error is slower with a rate of $$\mathcal{O}\left(\frac{1}{t}((\rho_2 + 1)/(\rho) + 1)\right)^t$$

for the non-bipartite case, and a similar degradation for the bipartite case. Hence, the version of the process 200 with self-update is not preferred for fixed graphs. However, since edges are dropped randomly in time-varying graphs, in order to preserve the node state information, the process 200 with self-updates is needed.

Consider equation (12) in the presence of packet loss. Since the packet loss is probabilistic, the convergence error is no longer deterministic. Let $b_{ij}(t) \sim \text{Ber}(1-\rho)$, and $P(b_{ij}(t)=0)=\rho$, $i \neq j$), be independent Bernoulli random variables capturing packet loss on edges. At each iteration, all the nodes 112 update their respective state values as, $$x_i(t+1) = \log\left(\exp\left(x_i(t) + \sum_{j=1}^{N} a_{ij} b_{ij}(t) \exp(x_j(t))\right)\right) \quad (13)$$

Equation (13) can be written in vector form as, $$x(t) = \log[(I + A_{t-1})\exp[x(t-1)]] \quad (14)$$
$$= \log[(I + A_{t-1})(I + A_{t-2})\ldots(I + A_0)1]$$
$$= \log\left[\left(\prod_{k=1}^{t}(I + A_k)\right)1\right],$$

where $A_k$ has elements $a_{ij}b_{ij}(k)$. The convergence of $$\frac{1}{t} \times (t)$$

can be established using the subadditive ergodic theorem. However, there is no closed form expression for the limiting value. This value is approximated for a d-regular graph to gain insight into the general case. After packet loss, the degree of each node i 112 at time k is a binomial $B_k^{(i)} \sim \text{Bin}(d, 1-\rho)$ random variable, which are the elements of the vector $A_k \mathbf{1}$. Approximating $B_k^{(i)} \approx B_k$ for every i, one can write using equation (14)

$$y_i(t) = \frac{1}{t}\log\left(\prod_{k=1}^{t}(1+B_k)\right) \qquad (15)$$

$$= \frac{1}{t}\sum_{k=1}^{t}\log(1+B_k)$$

By law of large numbers, equation (15) converges to $\mathbb{E}[\log(1+B_k)]$, which can be approximated using Jensen's inequality as $\log(1+d(1-p))\mathbf{1}$ by moving the expectation inside the concave function $\log(1+x)$. For irregular graphs, this formula empirically is seen to work by substituting $\rho$ for d, for large t as $$y(t) \approx \log(1+\rho(1-p))\mathbf{1}. \qquad (16)$$

Therefore, with the prior knowledge of p, $\rho$ can be estimated as $$\rho \simeq \frac{\exp[y(t)]-1}{1-p} \qquad (17)$$

If the knowledge of p is not available, the preceding analysis quantifies how much packet loss will affect the bias.

Simulations

Figure 3A:
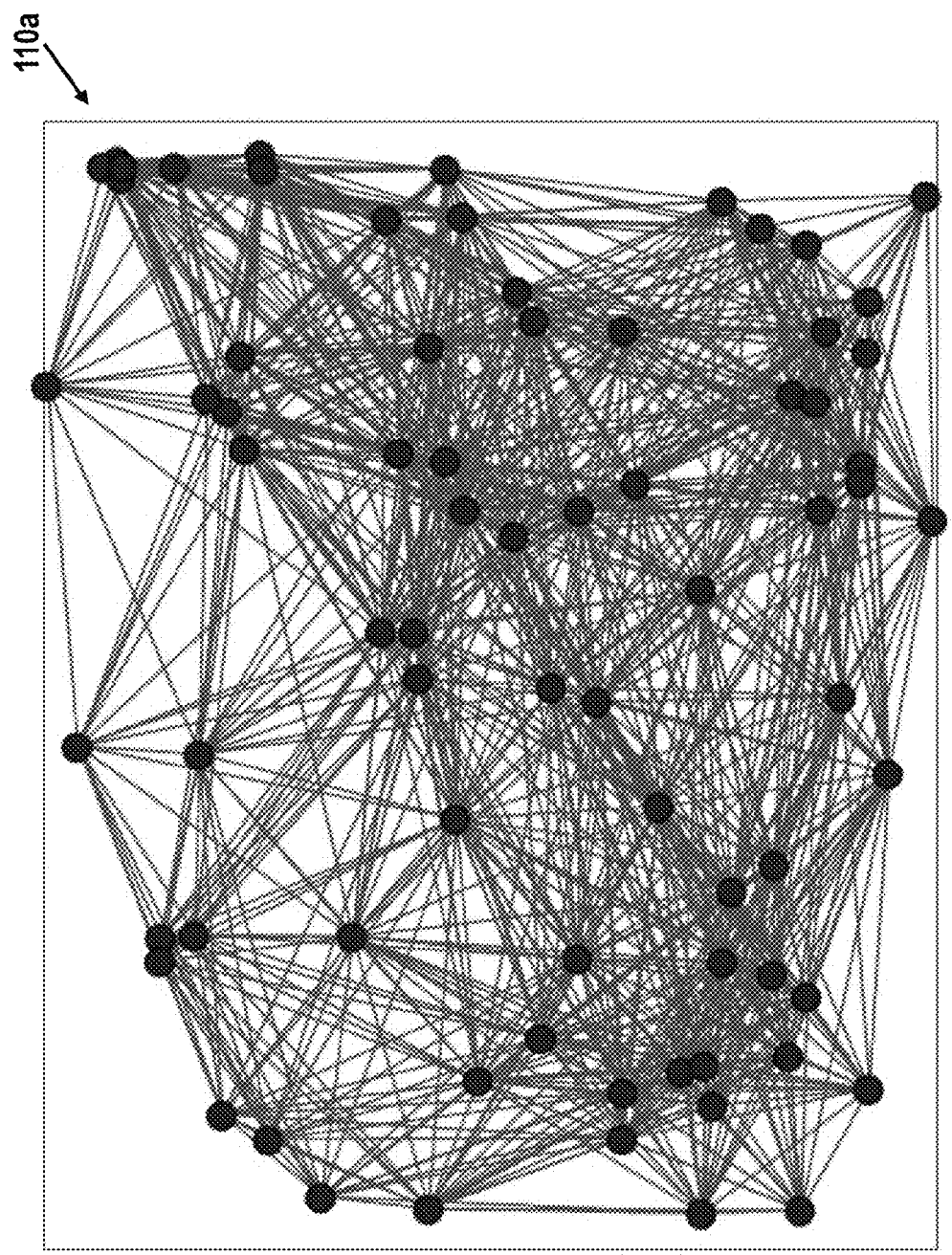
FIG. 3A is a graphical representation showing a non-bipartite graph with N=75 nodes for illustrating an effectiveness of the method of FIG. 1.
Figure 3B:
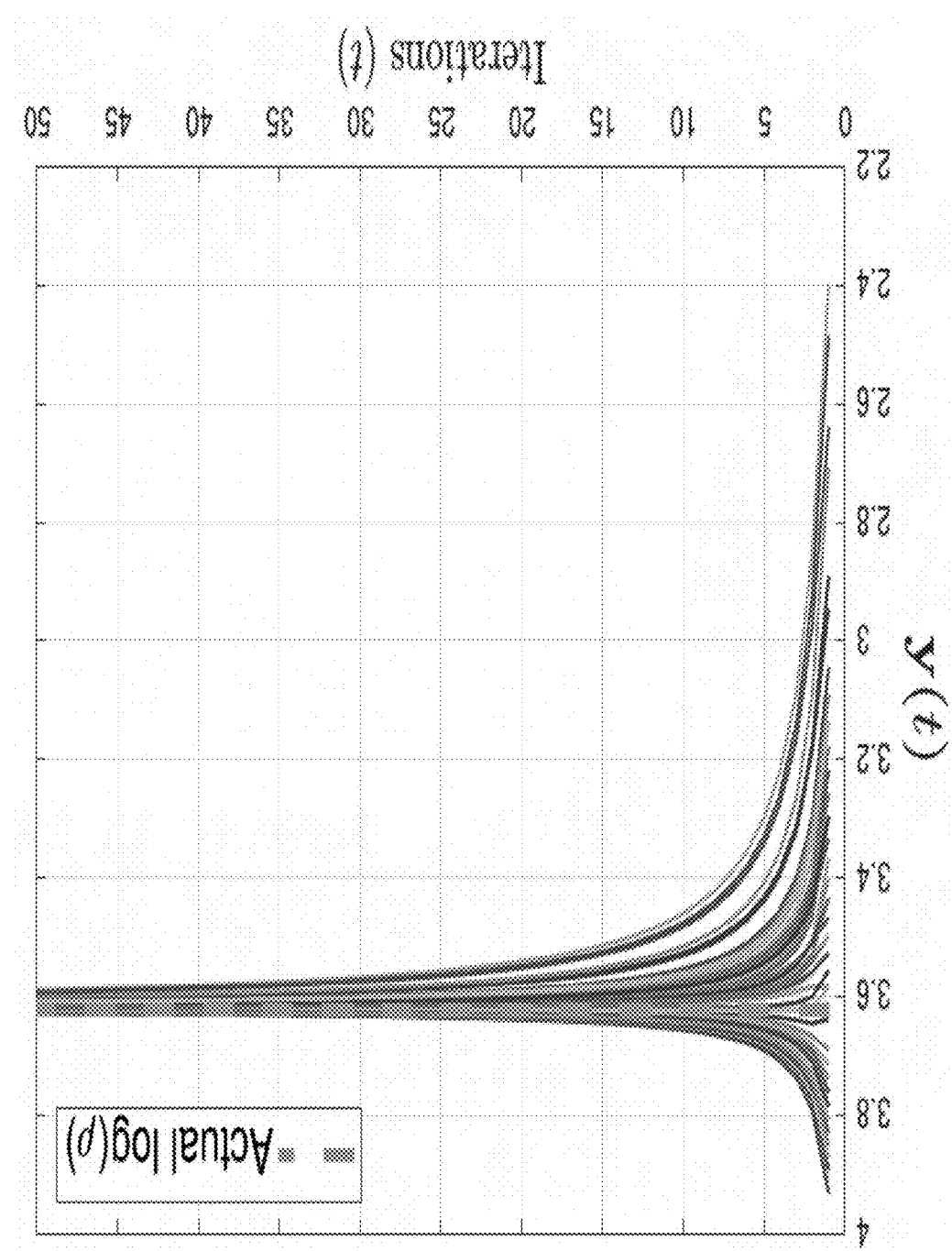
FIG. 3B is a graphical representation showing convergence of the method of FIG. 1 for the non-bipartite graph of FIG. 3A.
Figure 3C:
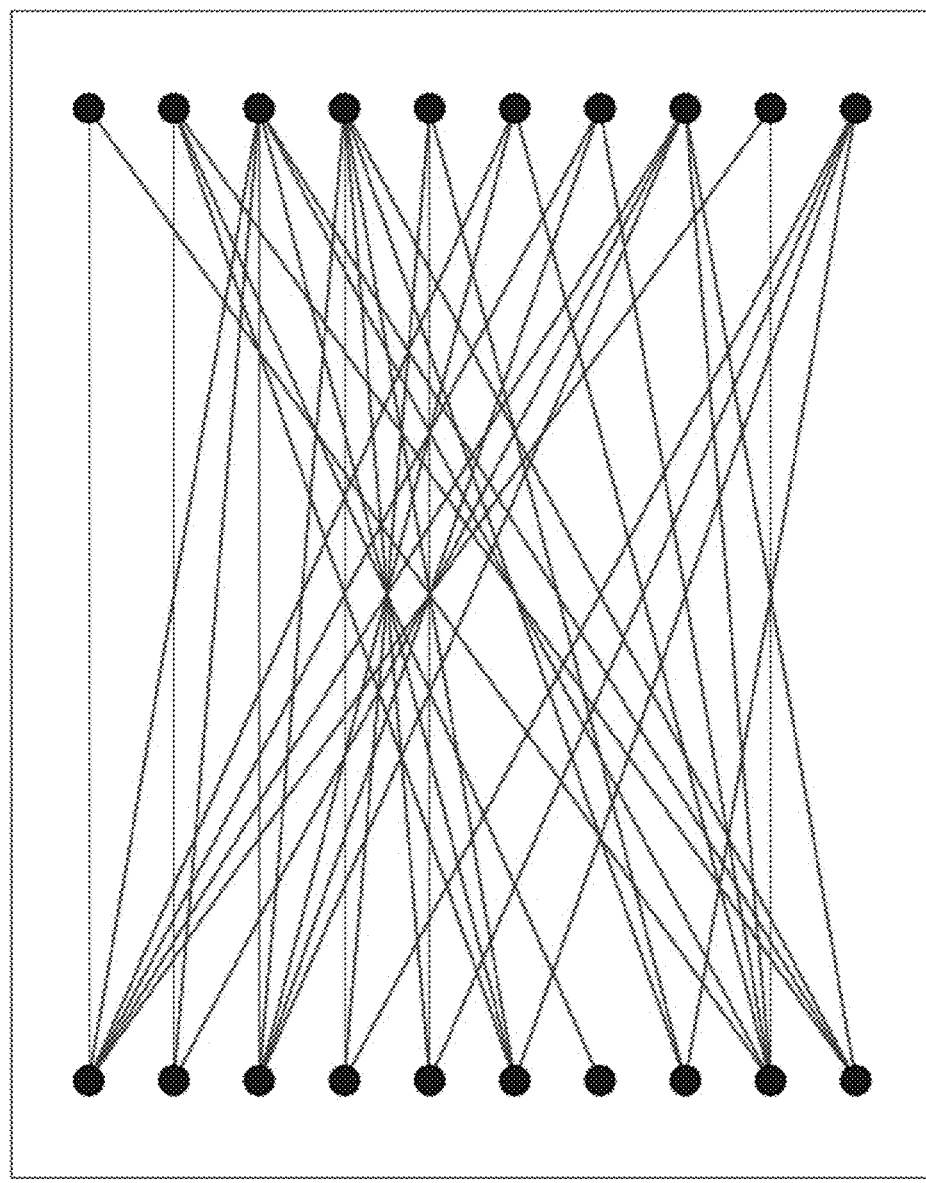
FIG. 3C is a graphical representation showing a bipartite graph with N=20 nodes for illustrating an effectiveness of the method of FIG. 1.

In this section, the disclosed process 200 is validated over both bipartite and non-bipartite graphs. FIG. 3A shows an irregular non-bipartite graph with N=75 nodes and FIG. 3C shows a bipartite graph with N=20 nodes. The irregular non-bipartite graph was randomly generated for average and max-consensus simulations. The spectral radius of the irregular graph in FIG. 3A is $\rho$=37.1142 and $\log(\rho)$=3.614, bipartite graph in FIG. 3C has $\rho$=4.3739 and $\log(\rho)$=1.4756

Figure 3D:
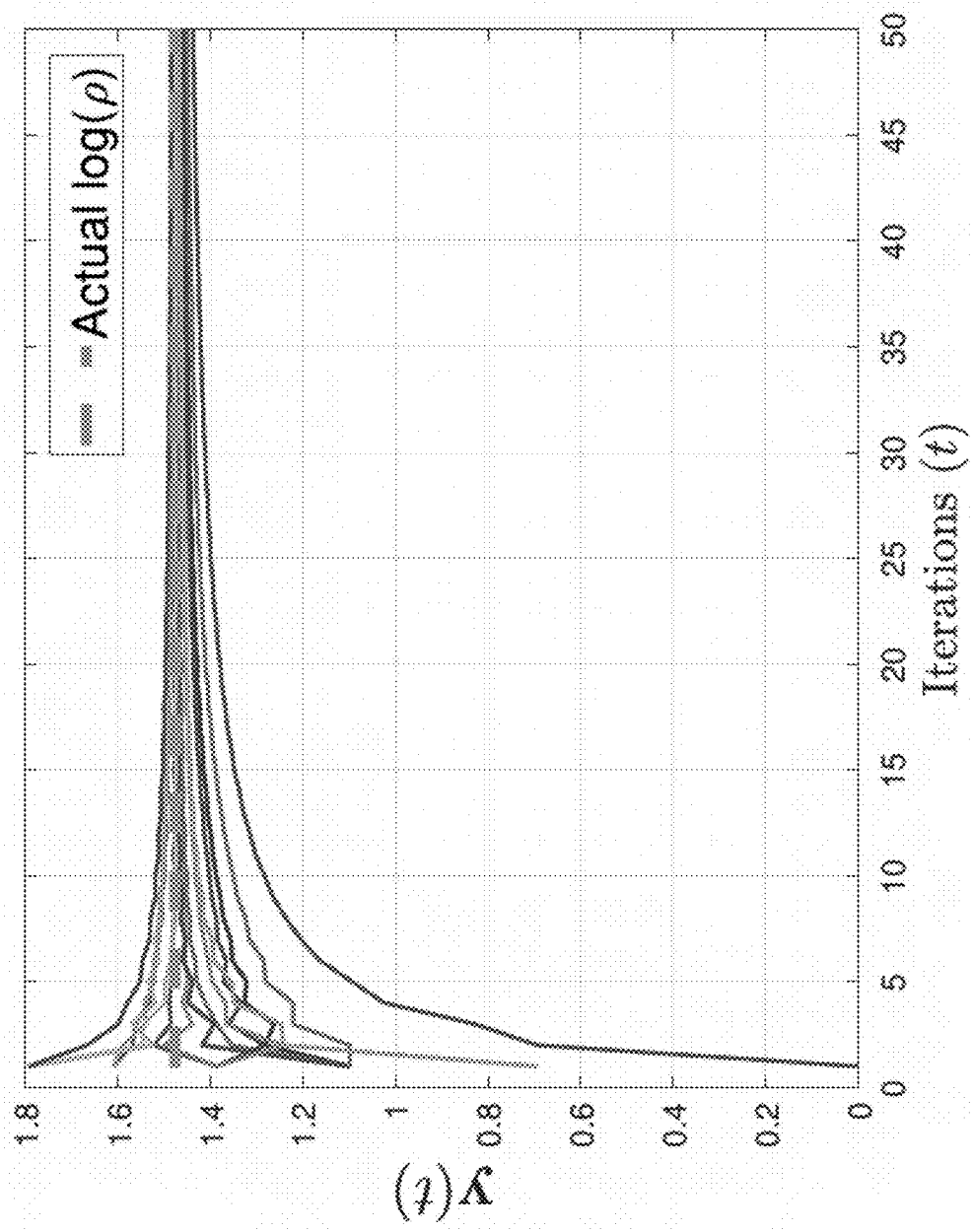
FIG. 3D is a graphical representation showing convergence of the method of FIG. 1 for the non-bipartite graph of FIG. 3C.

Algorithm 1 was run on bipartite and non-bipartite graphs for 50 iterations. The convergence of the Algorithm 1 for bipartite and non-bipartite graphs are shown in FIGS. 3B and 3D, respectively. For non-bipartite graphs, Algorithm 1 converges to $\log(\rho)$, with an error of 0.083%. In the case of bipartite graphs, Algorithm 1 converges to $\log(\rho)$, with an error of 0.46%. Additionally, damped oscillatory behavior was observed during the initial iterations caused due to the symmetric eigenvalues, reflecting the effect of the second term in equation (11).

Simulations for Time-Varying Graphs

Consider a regular and irregular graph with N=100. For the regular graph, the degree was varied as d={10, 20, . . . , 60} and the irregular graph was randomly generated. A probability of dropping edges (i.e. packet loss) was modeled as p={0, 0.1, . . . , 0.8}.

Figure 4:
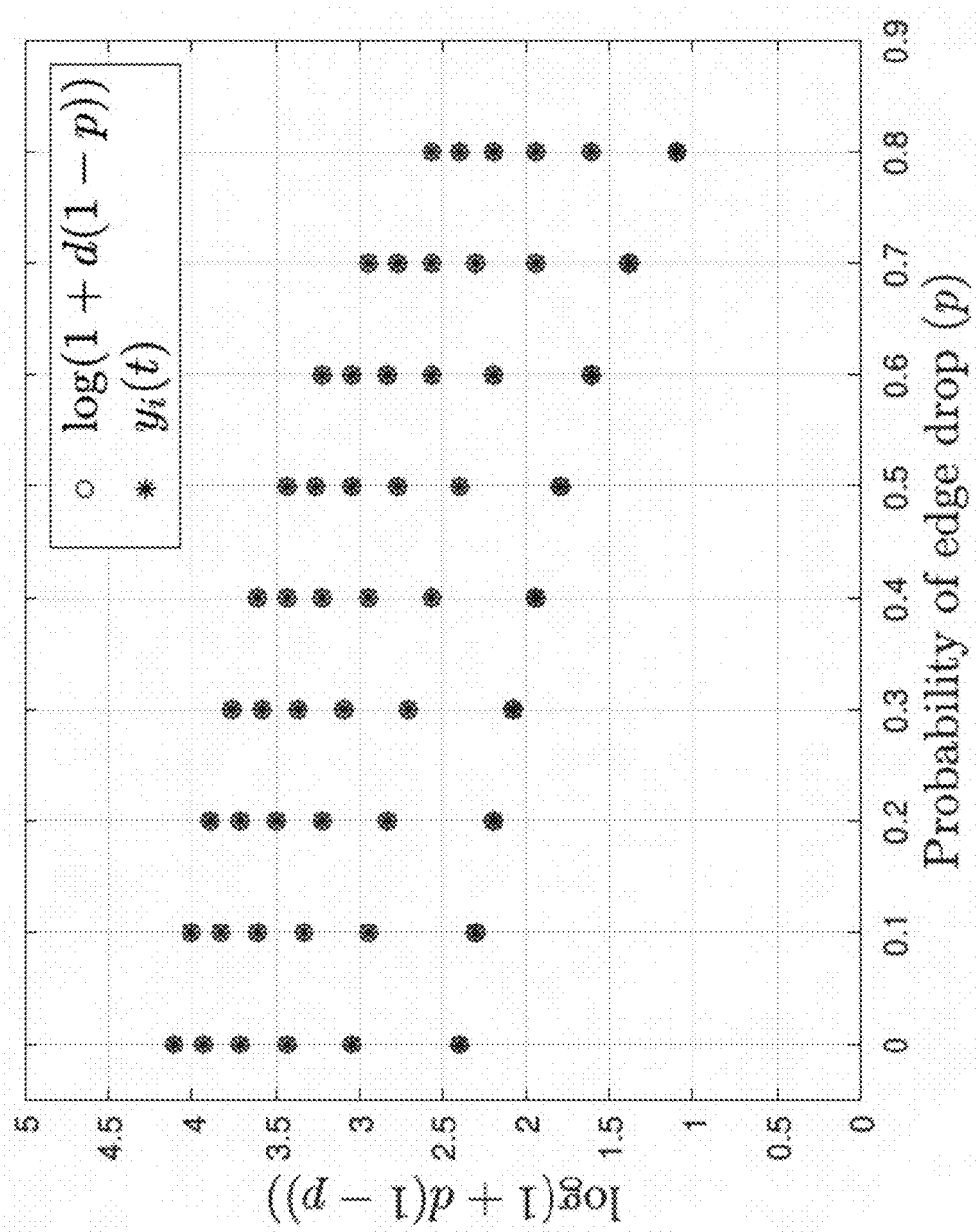
FIG. 4 is a graphical representation showing estimated $\log(1+d(1-p))$ for a regular time-varying graphs with N=100 as deduced using the wireless sensor network of FIG. 1.
Figure 5:
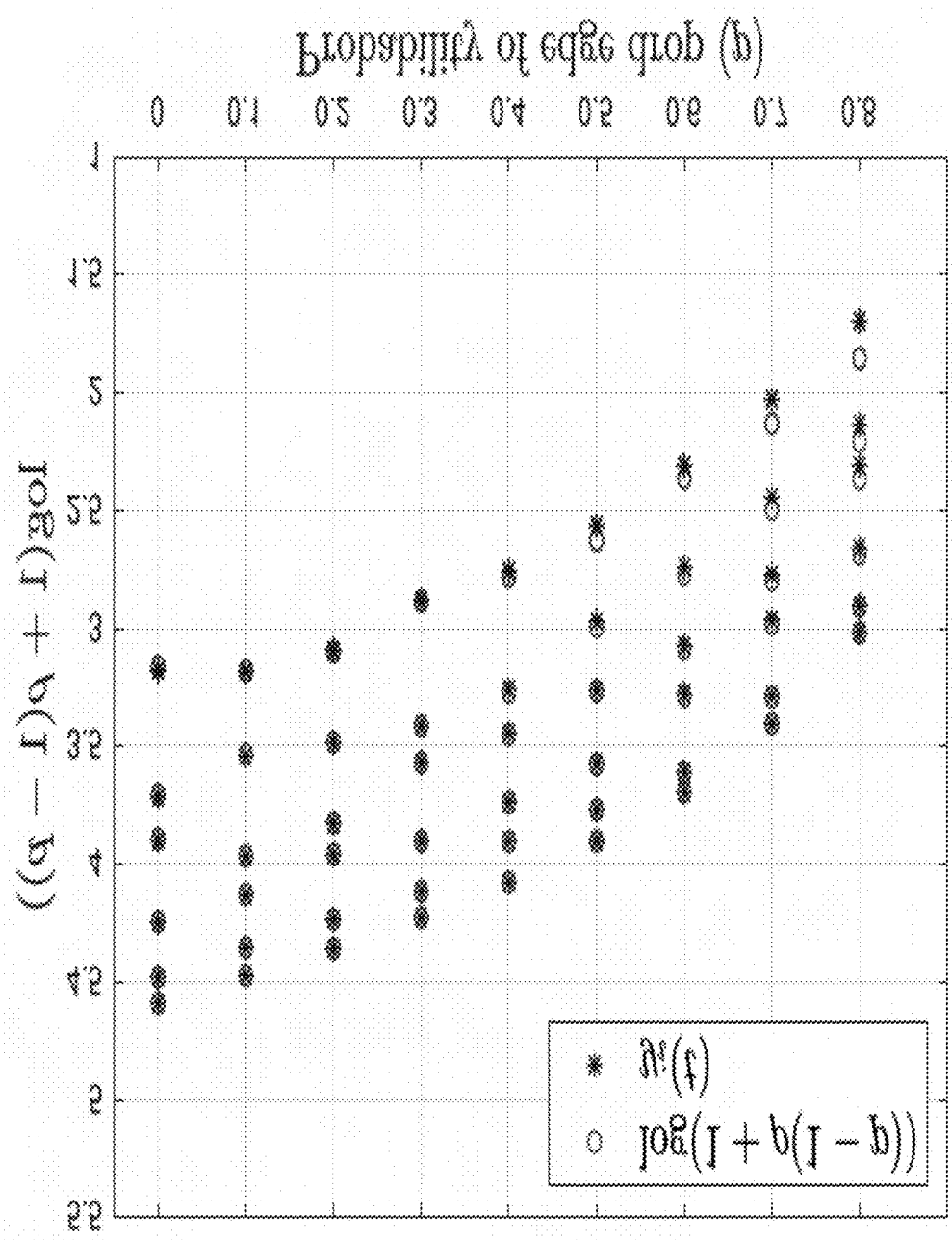
FIG. 5 is a graphical representation showing estimated $\log(1+\rho(1-p))$ for irregular time-varying graphs with N=100 as deduced using the wireless sensor network of FIG. 1.

For time-varying graphs, Algorithm 1 was modified by replacing Line 4 by equation (12), i.e with the self-update rule. This modified version was ran on the time-varying graphs for t=100 iterations. FIG. 4 shows the estimated value and the actual $\log(1+d(1-p))$ for different values of p for d-regular graphs. It has been observed that the estimated value is very close to the true value in all the cases. FIG. 5 shows the estimated value and the actual $\log(1+\beta(1-p))$ for different values of p for irregular graphs. It has also been observed that the estimated value is very close to the true value for graphs with large $\rho$ and $\rho \in (0, 0.6)$. However, a small estimation error was observed for large p, as the graph connectivity is significantly reduced.

The disclosed process 200 to compute the spectral radius of the network using only local communications involves a simple log-sum-exp updates, which is robust to packet loss and restricts the state values within the dynamic range. Additionally, theoretical results on convergence of the algorithm and estimation error were presented, for both bipartite and non-bipartite graphs. For irregular graphs, it was proven that the convergence error is a function of principal eigenvector of the graph adjacency matrix and reduces as $\mathcal{O}(1/t)$. The present process 200 was modified to work for time-varying graphs (which model real-life communication errors such as packet loss) and the theoretical results were presented for this setting. Simulation results supporting the theory were also presented.

Computer-Implemented System

Figure 6:
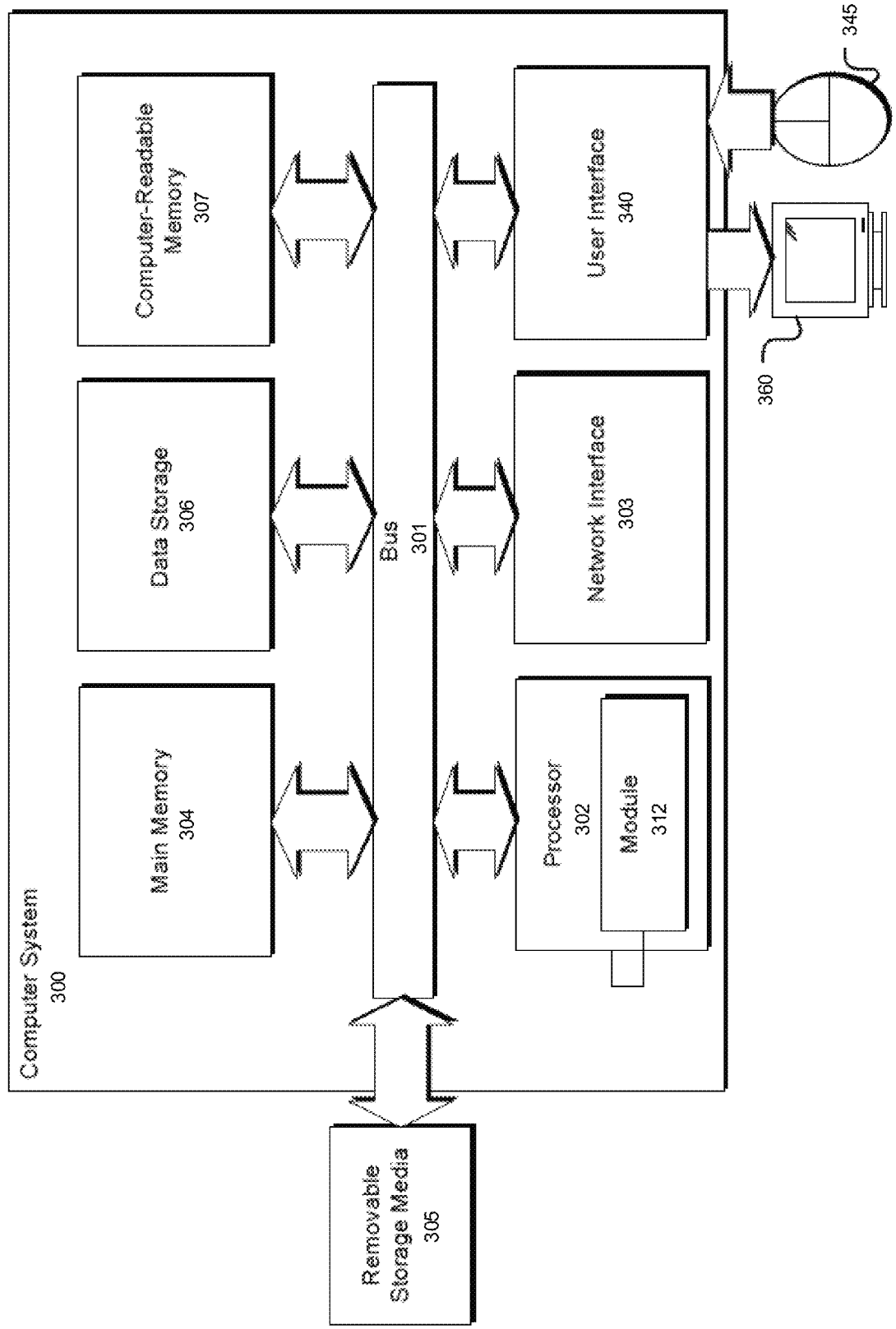
FIG. 6 is an exemplary computing system for use with the wireless sensor network of FIG. 1

FIG. 6 illustrates an example of a suitable computing and networking environment (computer system 300) which may be used to implement various aspects of the present disclosure including sensor computing system 114. Example embodiments described herein may be implemented at least in part in electronic circuitry; in computer hardware executing firmware and/or software instructions; and/or in combinations thereof. Example embodiments also may be implemented using a computer program product (e.g., a computer program tangibly or non-transitorily embodied in a machine-readable medium and including instructions for execution by, or to control the operation of, a data processing apparatus, such as, for example, one or more programmable processors or computers). A computer program may be written in any form of programming language, including compiled or interpreted languages, and may be deployed in any form, including as a stand-alone program or as a subroutine or other unit suitable for use in a computing environment. Also, a computer program can be deployed to be executed on one computer, or to be executed on multiple computers at one site or distributed across multiple sites and interconnected by a communication network.

Certain embodiments are described herein as including one or more modules. Such modules are hardware-implemented, and thus include at least one tangible unit capable of performing certain operations and may be configured or arranged in a certain manner. For example, a hardware-implemented module may comprise dedicated circuitry that is permanently configured (e.g., as a special-purpose processor, such as a field-programmable gate array (FPGA) or an application-specific integrated circuit (ASIC)) to perform certain operations. A hardware-implemented module may also comprise programmable circuitry (e.g., as encompassed within a general-purpose processor or other programmable processor) that is temporarily configured by software or firmware to perform certain operations. In some example embodiments, one or more computer systems (e.g., a stand-alone system, a client and/or server computer system, or a peer-to-peer computer system) or one or more processors may be configured by software (e.g., an application or application portion) as a hardware-implemented module that operates to perform certain operations as described herein.

Accordingly, the term "hardware-implemented module" encompasses a tangible entity, be that an entity that is physically constructed, permanently configured (e.g., hardwired), or temporarily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software, in the form of the system application 100 or otherwise, may include a hardware-implemented module and may accordingly configure a processor 202, for example, to constitute a particular hardware-implemented module at one instance of time and to constitute a different hardware-implemented module at a different instance of time.

Hardware-implemented modules may provide information to, and/or receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and may store the output of that operation in a memory device to which it is communicatively coupled. A further hardware-implemented module may then, at a later time, access the memory device to retrieve and process the stored output. Hardware-implemented modules may also initiate communications with input or output devices.

As illustrated, the computing and networking environment 300 may be a general purpose computing device 300, although it is contemplated that the networking environment 300 may include other computing systems, such as personal computers, server computers, hand-held or laptop devices, tablet devices, multiprocessor systems, microprocessor-based systems, set top boxes, programmable consumer electronic devices, network PCs, minicomputers, mainframe computers, digital signal processors, state machines, logic circuitries, distributed computing environments that include any of the above computing systems or devices, and the like.

Components of the general purpose computing device 300 may include various hardware components, such as a processing unit 302, a main memory 304 (e.g., a system memory), and a system bus 301 that couples various system components of the general purpose computing device 300 to the processing unit 302. The system bus 301 may be any of several types of bus structures including a memory bus or memory controller, a peripheral bus, and a local bus using any of a variety of bus architectures. For example, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The general purpose computing device 300 may further include a variety of computer-readable media 307 that includes removable/non-removable media and volatile/nonvolatile media, but excludes transitory propagated signals. Computer-readable media 307 may also include computer storage media and communication media. Computer storage media includes removable/non-removable media and volatile/nonvolatile media implemented in any method or technology for storage of information, such as computer-readable instructions, data structures, program modules or other data, such as RAM, ROM, EPSOM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information/data and which may be accessed by the general purpose computing device 300. Communication media includes computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. For example, communication media may include wired media such as a wired network or direct-wired connection and wireless media such as acoustic, RF, infrared, and/or other wireless media, or some combination thereof. Computer-readable media may be embodied as a computer program product, such as software stored on computer storage media.

The main memory 304 includes computer storage media in the form of volatile/nonvolatile memory such as read only memory (ROM) and random access memory (RAM). A basic input/output system (BIOS), containing the basic routines that help to transfer information between elements within the general purpose computing device 300 (e.g., during start-up) is typically stored in ROM. RAM typically contains data and/or program modules that are immediately accessible to and/or presently being operated on by processing unit 302. For example, in one embodiment, data storage 306 holds an operating system, application programs, and other program modules and program data.

Data storage 306 may also include other removable/non-removable, volatile/nonvolatile computer storage media. For example, data storage 306 may be: a hard disk drive that reads from or writes to non-removable, nonvolatile magnetic media; a magnetic disk drive that reads from or writes to a removable, nonvolatile magnetic disk; and/or an optical disk drive that reads from or writes to a removable, nonvolatile optical disk such as a CD-ROM or other optical media. Other removable/non-removable, volatile/nonvolatile computer storage media may include magnetic tape cassettes, flash memory cards, digital versatile disks, digital video tape, solid state RAM, solid state ROM, and the like. The drives and their associated computer storage media provide storage of computer-readable instructions, data structures, program modules and other data for the general purpose computing device 300.

A user may enter commands and information through a user interface 340 or other input devices 345 such as a tablet, electronic digitizer, a microphone, keyboard, and/or pointing device, commonly referred to as mouse, trackball, or touch pad. Other input devices 345 may include a joystick, game pad, satellite dish, scanner, or the like. Additionally, voice inputs, gesture inputs (e.g., via hands or fingers), or other natural user interfaces may also be used with the appropriate input devices, such as a microphone, camera, tablet, touch pad, glove, or other sensor. These and other input devices 345 are often connected to the processing unit 302 through a user interface 340 that is coupled to the system bus 301, but may be connected by other interface and bus structures, such as a parallel port, game port or a universal serial bus (USB). A monitor 360 or other type of display device is also connected to the system bus 301 via user interface 340, such as a video interface. The monitor 360 may also be integrated with a touch-screen panel or the like.

The general purpose computing device 300 may operate in a networked or cloud-computing environment using logical connections of a network Interface 203 to one or more remote devices, such as a remote computer. The remote computer may be a personal computer, a server, a router, a network PC, a peer device or other common network node, and typically includes many or all of the elements described above relative to the general purpose computing device 300. The logical connection may include one or more local area networks (LAN) and one or more wide area networks (WAN), but may also include other networks. Such networking environments are commonplace in offices, enterprise-wide computer networks, intranets and the Internet.

When used in a networked or cloud-computing environment, the general purpose computing device 300 may be connected to a public and/or private network through the network interface 303. In such embodiments, a modem or other means for establishing communications over the network is connected to the system bus 301 via the network interface 303 or other appropriate mechanism. A wireless networking component including an interface and antenna may be coupled through a suitable device such as an access point or peer computer to a network. In a networked environment, program modules depicted relative to the general purpose computing device 300, or portions thereof, may be stored in the remote memory storage device.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A system, comprising:
   a wireless sensor network including:
   a plurality of nodes, wherein each node of the plurality of nodes is operable for communication with one or more neighboring nodes of the plurality of nodes across a respective communication link and wherein each node of the plurality of nodes includes a respective computing device, the computing device including a processor in communication with a memory, the memory including instructions which, when executed, cause the processor to:
   (a) initialize a stored state value of the node to zero;
   (b) receive a state value for a previous time iteration from one or more neighboring nodes of the plurality of nodes;
   (c) update the stored state value for a current time iteration using the state values received from the one or more neighboring nodes of the plurality of nodes for the previous time iteration;
   (d) broadcast the updated stored state value for the current time iteration to the one or more neighboring nodes of the plurality of nodes; and
   (e) divide the updated stored state value by a total number of iterations to yield a consensus output value;
   wherein the consensus output value is indicative of a spectral radius of the wireless sensor network.

2. The system of claim 1, wherein the processor iteratively repeats steps (b)-(d) for $t_{max}$ iterations.

3. The system of claim 1, wherein the stored state value is updated according to:

$$x_i(t) = \log(\Sigma_{j=1}^{N} a_{ij} \exp(x_j(t-1)))$$

where i refers to a node, $x_i(t)$ is a given state value for the node at time iteration t, $x_j(t-1)$ is the state value received from a neighboring node j of the plurality of nodes for the previous time iteration t−1, $a_{ij}$ is a value denoting a relationship between the node and the neighboring node j, and N is a value denoting a quantity of the plurality of nodes in the wireless sensor network.

4. The system of claim 3, wherein the value of $a_{ij}$ is a 1 if node j is a neighbor of the node and wherein the value of $a_{ij}$ is a 0 if node j is not a neighbor of the node.

5. The system of claim 1, wherein each node of the plurality of nodes broadcasts a respective updated stored state value for the current time iteration to the one or more neighboring nodes of the plurality of nodes in a synchronized fashion.

6. The system of claim 1, wherein the stored state value is updated according to:

$$x_i(t+1) = \log\left(\exp\left(x_i(t) + \sum_{j=1}^{N} a_{ij} b_{ij}(t) \exp(x_j(t))\right)\right)$$

where i refers to a node, $x_i(t)$ is a given state value for the node at time iteration t, $a_{ij}$ is a value denoting a relationship between the node and the neighboring node j, $b_{ij}(t)$ is an time-dependent independent Bernoulli random variable, and N is a value denoting a quantity of the plurality of nodes in the wireless sensor network.

7. The system of claim 6, wherein the value of a $a_{ij}$ is a 1 if node j is a neighbor of the node and wherein the value of a $a_{ij}$ is a 0 if node j is not a neighbor of the node.

8. The system of claim 1, wherein the consensus output value is determined according to:

$$y_i(t) = \frac{1}{t} x_i(t)$$

where j refers to a node, where $x_i(t)$ is a given state value for the node at time iteration t, $t=t_{max}$ and where $t_{max}$ is the final time iteration.

9. The system of claim 8, wherein the consensus output value is an approximation of log(p), wherein p is a spectral radius value.

10. A method for determining a spectral radius of a wireless sensor network, comprising:
   (a) providing a wireless sensor network including a plurality of nodes, wherein each node of the plurality of nodes is operable for communication with one or more neighboring nodes of the plurality of nodes across a respective communication link and wherein each node of the plurality of nodes includes a respective computing device;
(b) initialize a stored state value of the node to zero at the respective computing device of the node;
(c) receive a state value for a previous time iteration from one or more neighboring nodes of the plurality of nodes;
(d) update the stored state value for a current time iteration using the state values received from the one or more neighboring nodes of the plurality of nodes for the previous time iteration;
(e) broadcast the updated stored state value for the current time iteration to the one or more neighboring nodes of the plurality of nodes; and
(f) divide the updated stored state value by a total number of iterations after a final time iteration to yield a consensus output value;
wherein the consensus output value is indicative of a spectral radius of the wireless sensor network.

11. The method of claim 10, wherein steps (c)-(e) are iteratively repeated until the final time iteration is reached.

12. The method of claim 10, further comprising:
increment a time iteration after the stored state value is updated.

13. The method of claim 10, wherein the stored state value is updated according to:

$$x_i(t) = \log(\Sigma_{j=1}^{N} a_{ij} \exp(x_j(t-1)))$$

where i refers to a node, $x_i(t)$ is a given state value for the node at time iteration t, $x_j(t-1)$ is the state value received from a neighboring node j of the plurality of nodes for the previous time iteration t−1, a $a_{ij}$ is a value denoting a relationship between the node and the neighboring node j, and N is a value denoting a quantity of the plurality of nodes in the wireless sensor network.

14. The method of claim 13, wherein the value of $a_{ij}$ is a 1 if node j is a neighbor of the node and wherein the value of a $a_{ij}$ is a 0 if node j is not a neighbor of the node.

15. The method of claim 10, wherein each node of the plurality of nodes broadcasts a respective updated stored state value for the current time iteration to the one or more neighboring nodes of the plurality of nodes in a synchronized fashion.

16. The method of claim 10, wherein the stored state value is updated according to:

$$x_i(t+1) = \log\left(\exp\left(x_i(t) + \sum_{j=1}^{N} a_{ij} b_{ij}(t) \exp(x_j(t))\right)\right)$$

where i refers to a node, $x_i(t)$ is a given state value for the node at time iteration t, $x_j(t-1)$ is the state value received from a neighboring node j of the plurality of nodes for the previous time iteration t−1, a $a_{ij}$ is a value denoting a relationship between the node and the neighboring node j, $b_{ij}(t)$ is an time-dependent independent Bernoulli random variable, and N is a value denoting a quantity of the plurality of nodes in the wireless sensor network.

17. The method of claim 16, wherein the value of $a_{ij}$ is a 1 if node j is a neighbor of the node and wherein the value of a $a_{ij}$ is a 0 if node j is not a neighbor of the node.

18. The method of claim 10, wherein the consensus output value is determined according to:

$$y_i(t) = \frac{1}{t} x_i(t)$$

where i refers to a node, where $x_i(t)$ is a given state value for the node at time iteration t, $t=t_{max}$ and where $t_{max}$ is the final time iteration.

19. The method of claim 18, wherein the consensus output value is an approximation of log(p), wherein p is a spectral radius value.

20. The method of claim 10, further comprising:
receive as input N, A, and $t_{max}$, where N is an integer denoting a total number of nodes in the wireless sensor network, A is an adjacency matrix denoting a relationship between each respective node of the plurality of nodes, and where $t_{max}$ is a maximum quantity of time iterations.

* * * * *